United States Patent Office 2,813,921
Patented Nov. 19, 1957

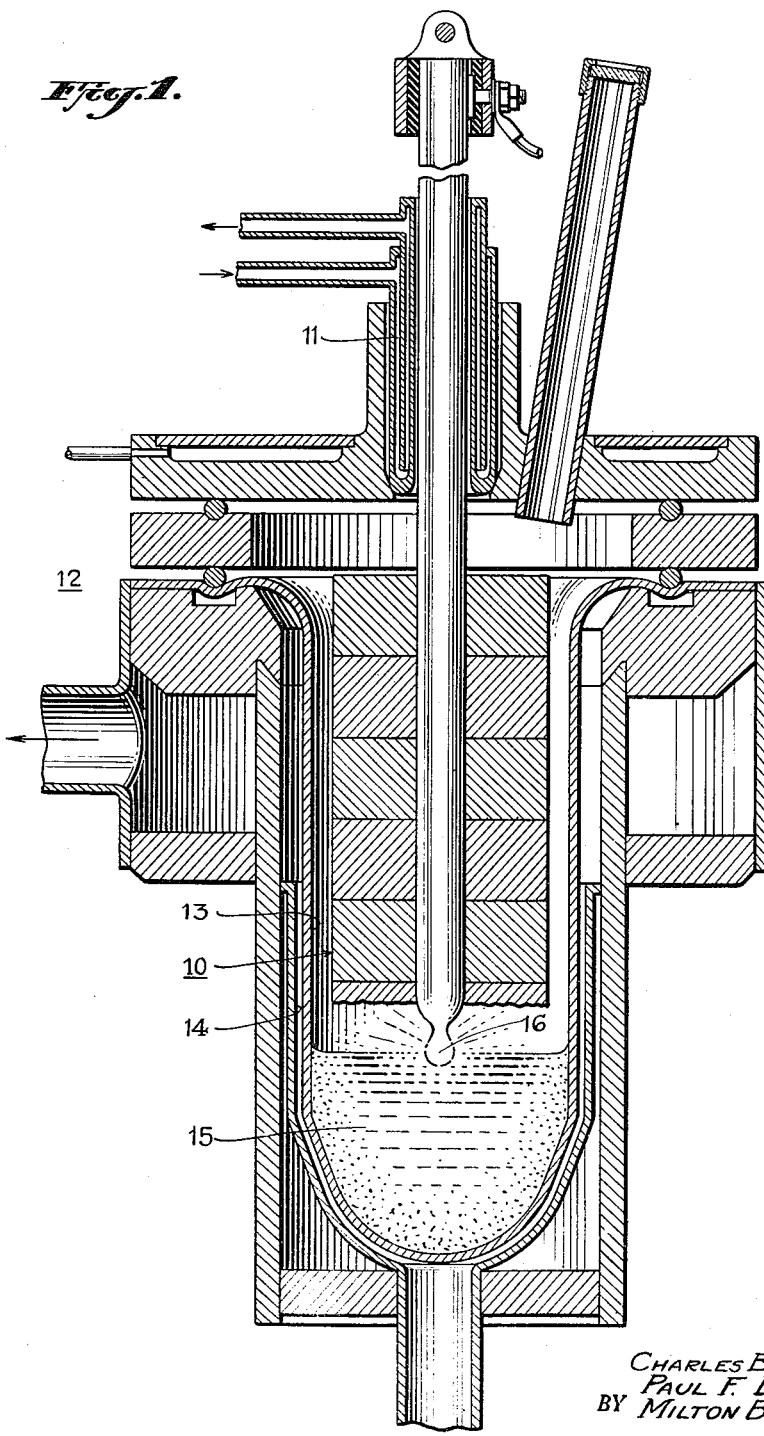

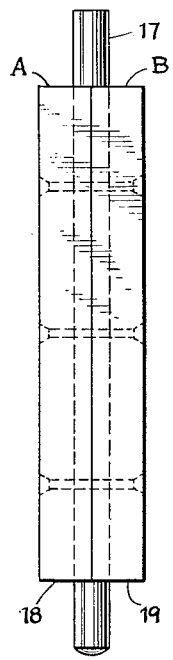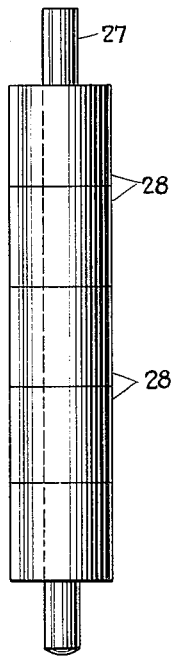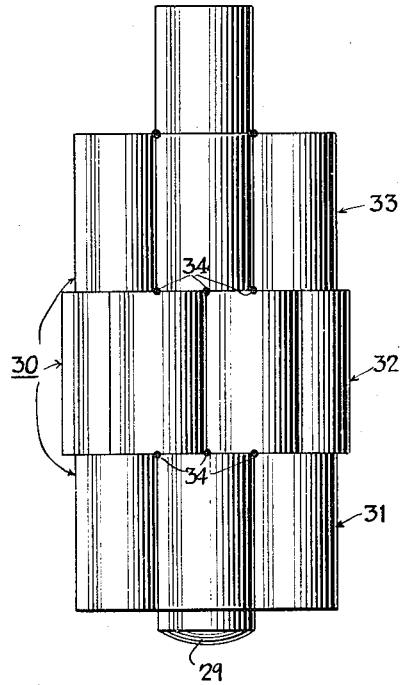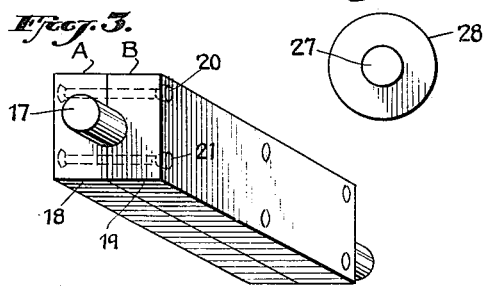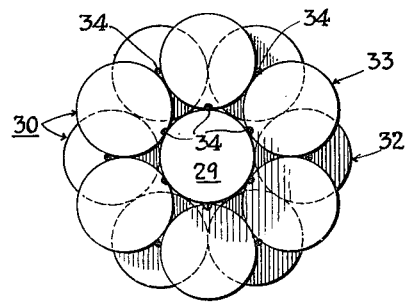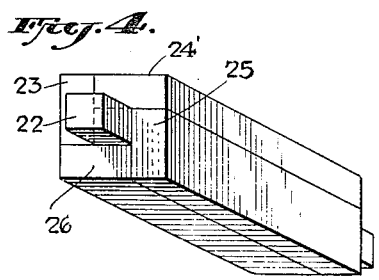

2,813,921

CONSUMABLE ELECTRODE FOR MELTING OF CHEMICALLY REACTIVE METALS

Milton B. Vordahl and Paul F. Darby, Beaver, and Charles E. Newcomb, Industry, Pa., assignors to Rem-Cru Titanium, Inc., Midland, Pa., a corporation of Pennsylvania Application May 10, 1954, Serial No. 428,572

6 Claims. (Cl. 13—18)

This invention pertains to improvements in the production of ingots of metals that are highly reactive chemically, particularly titanium, zirconium and alloys of each, by the employment of consumable electrodes of such metals, and the arc melting of the same, in an inert atmosphere, in a cold mold crucible, such as a water-cooled copper crucible. The invention pertains more particularly to improvements in the fabrication and construction of consumable electrodes for such purposes.

In order to eliminate the now well-known objectionable features attendant upon the non-consumable electrode type of "cold mold" melting for producing ingots of this character, wherein titanium sponge or an appropriate admixture of titanium sponge and chips of one or more alloying metals are fed gradually by gravity into a water-cooled crucible and arc melting in an inert atmosphere by means of a tungsten or equivalent electrode, it has been heretofore proposed to substitute for the tungsten electrode, a consumable electrode made of the metal to be melted. Such consumable electrode has been composed, for example, of titanium sponge for the production of pure titanium ingots, or an admixture of titanium sponge and alloying metal chips for producing alloys of titanium.

Such consumable electrode melting, as compared to the non-consumable electrode type, produces substantially improved results in that it provides better homogeneity of the ingot due to a deeper molten pool. Further, it is free of contamination by the electrode, requires less melting time and consequently increases ingot production rate. Also, it requires less power because the energy used to heat the electrode contributes to melting.

However, one of the chief obstacles heretofore encountered in the successful utilization of consumable electrodes of this character has resided in the extreme difficulty of economical manufacture of the electrode itself. Methods have been suggested in the past which involved compacting titanium sponge, or such sponge and alloying metal chips, under high mechanical pressure to produce a plurality of relatively thin briquets or biscuits of short, substantially cylindrical form having small thickness, and thereafter joining same as by welding into a long rod. Also, such comminuted material has been compacted by rollers into a continuous strip bonded together by adhesion.

However, with respect to the making of certain alloys of titanium by means of such consumable electrodes compacted from comminuted titanium and particles of alloying metal, certain seriously objectionable features have arisen. For example, the elimination of unmelted particles of high melting point alloying constituents, such as chromium, molybdenum, tungsten, etc., has been a major problem in the alloying of titanium, particularly with large percentages of such refractory metals. For example, molybdenum chips admixed and compacted with titanium sponge have been found to enter the ingot without melting to an appreciable extent, being released from the electrode by the melting of the surrounding titanium sponge. Attempts have been made to overcome this difficulty by employing molybdenum in finely divided or powdered form but with only partial success because the powder contains more oxygen than is desirable or tolerable.

Also, in the production of large ingots from consumable electrodes composed of a stacked and welded assembly of compacted briquets, the resulting rod-like electrode is relatively fragile and subject to rather easy breakage especially when produced in long lengths. Consequently, in order to avoid breakage in shipping or excessive handling, such electrodes are produced at a location adjacent the furnace. In another modification the electrode is formed continuously within the furnace housing and fed continuously to the arc region as it is formed. The mechanism and procedure for making such electrodes either exterior to or within the furnace, are complicated and expensive.

In the production of large ingots the suggestion has also been made to employ large monolithic consumable electrodes of compressed comminuted material, such as titanium sponge or a mixture of sponge and alloying metal chips, made outside the furnace. However, this has proven objectionable because of the fragility of the electrode so formed, and because the press required is both large and expensive due to the high pressures and large molding volume required.

In accordance with the present invention, consumable electrodes of novel construction are provided consisting essentially in a central core of solid metal, such as a forged or rolled bar of melt-cast titanium, or of an alloying metal, such as molybdenum, manganese, aluminum, etc., on or about which are assembled one or a series of pressed briquets of comminuted metal, such for example, as titanium or zirconium sponge or admixtures thereof with alloying metal chips.

In accordance with one modification, these briquets may be pressed into cylindrical, cubical or other polygonal shape, centrally drilled and assembled on the core in stacked relation, with tack welding at the top and bottom of the assembly and elsewhere as required for sufficiently integrating the same.

In another modification, the briquets may be pressed into elongated slabs of rectangular, semi-cylindrical or other contour, and either assembled lengthwise about a core of rectangular section, or suitably grooved lengthwise for assembling about a core of circular section, and the assembly integrated by riveting, welding, wiring, etc.

In still another and most preferred modification, the briquets are pressed into the form of relatively short cylinders which are clustered in successive tiers about the core and secured to one another and to the core as by tack welding, strapping, wiring, etc.

The advantages of such constructions are manifold. The core being a forged or rolled bar of solid metal thus inherently possesses, with ample margin to spare, the strength and rigidity required for supporting the briquets assembled thereon, even for the melting of the largest and heaviest ingots. Also such assembly greatly shortens the over-all length of the electrode for producing an ingot of given weight, since the assembly of the briquets on or about the core, increases the sectional area and thus reduces the height for a given total volume of material to be melted.

For the production of alloys of titanium or zirconium with other metals, the consumable electrode construction of the invention provides advantages which are unique and unapproached by any construction heretofore known. Thus by making the central core of the alloying metal, the arc struck therefrom must necessarily melt the core along with the surrounding titanium or zirconium sponge thus to assure the production of a homogeneous ingot. This becomes of paramount importance in the production of alloys of titanium or zirconium with high melting-point or refractory metals like molybdenum, chromium, tungsten, etc., and particularly where the resulting alloy contains large percentages of such elements, for example, a titanium base alloy containing say 30–40% of molybdenum.

The cores employed in the invention may also be rolled or forged agglomerates of coarse scrap. Also for the melting of titanium-aluminum alloys, the core may be of continuous aluminum, for example, in pipe form.

Referring to the annexed drawings:

Fig. 1 is a vertical sectional elevation through a conventional cold mold type of furnace showing the employment therein of a consumable electrode in accordance with one modification of the present invention comprising a core of solid metal extending through and carrying a stacked assembly of cylindrical briquets of compacted comminuted metal;

Fig. 2 is a side elevation of one form of consumable electrode according to the invention and comprising a solid metal core encased in elongated slabs of pressed titanium sponge or the like and integrated by riveting;

Fig. 3 is a perspective view of the electrode shown in Fig. 2;

Fig. 4 is a perspective view of still another form of electrode in accordance with the invention and composed of a central core of continuous metal, for example, of substantially square or rectangular cross section to each side of which is secured a slab-like briquet of compacted comminuted metal also of substantially rectangular cross section;

Fig. 5 is a side elevation and Fig. 6 an end elevation of another form of consumable electrode embodying the present invention, and comprising a core of continuous or solid metal extending through and mounting a stacked assembly of compacted cylindrical briquets drilled for reception of the core; and Fig. 7 is a side elevation and Fig. 8 an end view of still another form of consumable electrode in accordance with the invention and composed of a core of solid metal around which is clustered a plurality of cylindrical briquets disposed in successive tiers along the core.

Referring now to Fig. 1, a consumable electrode 10, of the construction shown in Figs. 5 and 6, is mounted in an electrode holder 11 of a conventional type of cold mold furnace, shown generally at 12. No detailed description of this furnace is required since, as aforementioned, it is of conventional construction. Such furnace employs a thin-walled copper crucible 13, which is water-cooled, as at 14. The building up of an ingot 15 from the consumable electrode 10 is effected by the conventional arc melting procedure, the arc being shown at 16.

The consumable electrode of Figs. 2 and 3 comprises a core 17 of solid metal, such as a rolled bar of melt-cast titanium metal, or a bar of an alloying metal, such as molybdenum, chromium, aluminum, etc. About the core are assembled a pair of rectangular elongated slabs 18, 19, of for example, pressed titanium sponge, these slabs being appropriately grooved longitudinally, and arcuately in transverse section to fit about the cylindrical core, and integrated by doweling pins or rivets, as at 20, 21. For the production of alloys, the slabs 18, 19 may also be forged or rolled sections of melt-cast titanium or zirconium, in which case the core would of course be of a different metal or alloy to be alloyed with the metal of the encasing slabs.

Fig. 4 shows a generally similar embodiment to that of Figs. 2 and 3, in that it is composed of a central core 22 of substantially square or rectangular cross section which is surrounded by elongated slabs 23–26, inc., which also are of substantailly rectangular cross sectional shape, the assembly being integrated by welding or the like. The core and encasing slabs may of course be in accordance with the various combinations as to materials discussed with reference to Figs. 2 and 3.

For pressing the slab-like briquets of titanium sponge or the like, pressures of about seventy-five tons per square inch may be employed in order to provide a briquet having a density about 85% of that of the corresponding cast metal. Such pressure, however, may vary between, for example, 20 to 100 tons per square inch. There is thus produced a substantially solid and self-supporting briquet.

Referring to the form of the invention shown in Figs. 5 and 6, the electrode is composed of a central core member 27 also of continuous or solid metal, for example, of circular cross section, which extends through central perforations of a plurality of cylindrical compacts of comminuted metal. The compacts, in the form shown, are indicated at 28. This form of the invention is also well adapted for the melting of titanium alloys, for example, alloys of titanium with molybdenum, aluminum, etc.

The aforementioned compacts 28 may be formed by high mechanical pressure in a manner similar to the formation of the briquets described above in connection with Fig. 4, except that they are pressed in a mold of cylindrical conformation instead of one having a square or rectilinear transverse cross section. Such briquets, as aforementioned, are pressed from titanium or zirconium sponge, flakes, powder, chips, etc., or such sponge plus chips or scraps of alloying metal.

It is, of course, understood that the relative sizes and weights of the core members and the surrounding sub-electrode members, such as the briquets, are carefully preselected to produce an ingot having the desired qualities as to percentages of its ingredients.

Following the pressing of the briquets 28 under high mechanical pressure, suitable longitudinally extending holes are formed therein, preferably by drilling, through which the central core 27 extends for purposes of mounting the briquets, as shown in Fig. 5. The briquets may be secured to the core 27 by any suitable means, such as by tack welding, riveting, etc.

Referring now to Fig. 7 and Fig. 8, there is illustrated a form of the invention which is especially adapted for the making of large size ingots. This form of the invention is composed of a core 29 of solid or continuous metal with cylindrical briquets 30 clustered about it and secured thereto by tack welding, strapping, wiring, etc.

The core 29 may be of titanium, zirconium or other metal. It is of continuous metal and may be wrought or cast. Or such core may be formed from powder metallurgy material. Such core may constitute, for example, 20% of the total weight of the consumable electrode but this, of course, can vary as required.

In order to mount as large a number as possible of the briquets 30 upon the core 29, it has been found desirable to press same as aforementioned in the form of cylinders and to arrange same with the longitudinal axes thereof substantially parallel to one another and to the longitudinal axis of the core 29, the briquets being mounted in a plurality of groups, arranged in successive tiers, each group comprising as many briquets as can be mounted around the core and in contact therewith and with the next adjacent briquets in the same group. In the form shown, there are three superimposed groups or tiers of such briquets which make up the entire cluster thereof. The lowermost group 31 is slightly angularly offset with respect to the intermediate group 32 whereby the axes of the superimposed briquets are not in precise alignment, thereby providing a more desirable distribution of the mass of briquet material. The topmost group of briquets 33 is analogously angularly offset with respect to group 32. Each individual briquet is attached by tack welding, as at 34, to the central core 29.

In the form of the electrode shown in Figs. 7 and 8, the relative sizes of the diameter of the core 29 and of the briquets clustered thereabout, is such that each of the groups 31–33, inc., consists of six briquets but this, of course, can be varied as desired. The over-all length of the electrode, as shown in Fig. 7, may vary between, for example, about 9–15 feet and the over-all diameter may vary between about 10–30 inches, depending upon the total weight desired, more or less, in each case. The total electrode weight can vary, for example, up to about 2 tons, although this may be exceeded.

A typical briquet employed in this invention, with particular reference to Fig. 7, may weigh about 10 pounds and may be 3–6 inches in diameter and, for example, from 2–6 inches in length. As aforementioned, it may be pressed from titanium sponge or titanium sponge plus alloying chips, or from the scrap material set forth above, by means of a press which can exert pressures between, for example, 20–100 tons per square inch.

The core of any of the consumable electrodes embodying the present invention is attached preferably by welding or threading to the aforementioned water-cooled electrode holder 11 (Fig. 1) which supports the entire assembly during the melting.

There are thus provided consumable electrodes of novel construction having a number of outstanding advantages, among which are: practicality of construction and operation and economical to assemble entirely apart from furnace operation whereby melting and electrode manufacture are separated. Further, since the central core can enter the melt only by first becoming melted, high melting point alloying ingredients, such as molybdenum, can be successfully fusion alloyed with titanium. Also massive scrap, as well as scrap of smaller size, may constitute the central core.

What is claimed is:

1. A consumable electrode for the production of alloy ingots of chemically highly reactive metals which comprises an elongated core element of solid metal having assembled rigidly thereon a plurality of metallic sub-elements of lesser length than said core, with said core projecting at at least one end beyond said sub-element assembly, thereby providing space for securing said core to an electrode holder, said metallic sub-elements comprising briquettes containing as an essential component a chemically highly reactive metal selected from the group consisting of titanium and zirconium and mixtures thereof.

2. A consumable electrode for the production of alloy ingots of chemically highly reactive metals which comprises an elongated core element of wrought metal, having assembled rigidly thereon a plurality of compacted comminuted metallic sub-elements of reduced length, said sub-elements containing as an essential component a chemically reactive metal selected from the group consisting of titanium and zirconium and mixtures thereof.

3. A consumable electrode as set forth in claim 2, wherein the metallic sub-elements comprise alloying metal and chemically highly reactive metal selected from the group consisting of titanium, zirconium and mixtures thereof.

4. A consumable electrode as set forth in claim 3 wherein the chemically highly reactive metal is titanium sponge.

5. A consumable electrode for the production of titanium alloys which comprises an elongated core element of wrought alloying metal, having assembled rigidly thereon a plurality of compacted comminuted metallic sub-elements of reduced length, said sub-elements comprising alloying metal and titanium.

6. A consumable electrode for the production of alloy ingots of chemically highly reactive metals which comprises an elongated wrought core element including a chemically highly reactive metal, having assembled thereon a plurality of compacted comminuted metallic sub-elements of reduced length, said sub-elements comprising alloying metal and a chemically highly reactive metal, the chemically highly reactive metal being selected from the group consisting of titanium, zirconium and mixtures thereof.

References Cited in the file of this patent

UNITED STATES PATENTS

| | | |
|---|---|---|
| 324,658 | Cowles et al. | Aug. 18, 1885 |
| 430,453 | Willson | June 17, 1890 |
| 473,117 | Heroult | Apr. 19, 1892 |
| 588,866 | Keneval | Aug. 24, 1897 |
| 770,189 | Schoellhorn et al. | Sept. 13, 1904 |
| 1,085,951 | Strohmenger | Feb. 3, 1914 |
| 1,091,559 | Brown | Mar. 31, 1914 |
| 1,202,887 | Phelps | Oct. 31, 1916 |
| 1,313,126 | Shoeld | Aug. 12, 1919 |
| 1,545,951 | Fairchild et al. | July 14, 1925 |
| 2,061,350 | Coupier et al. | Nov. 17, 1936 |
| 2,240,231 | Stalhane | Apr. 29, 1941 |
| 2,262,887 | Deppeler | Nov. 18, 1941 |
| 2,303,973 | Armstrong | Dec. 1, 1942 |
| 2,431,474 | Gaudenzi | Nov. 25, 1947 |
| 2,477,279 | Anderson | July 26, 1949 |
| 2,686,822 | Evans et al. | Aug. 17, 1954 |
| 2,697,126 | Herres | Dec. 14, 1954 |

FOREIGN PATENTS

| | | |
|---|---|---|
| 20,600 | Great Britain | Sept. 17, 1896 |
| 671,171 | Great Britain | Apr. 30, 1952 |